United States Patent
Ciarlini et al.

(10) Patent No.: US 10,592,813 B1
(45) Date of Patent: Mar. 17, 2020

(54) METHODS AND APPARATUS FOR DATA OPERATION PRE-PROCESSING WITH PROBABILISTIC ESTIMATION OF OPERATION VALUE

(71) Applicant: EMC IP Holding Company LLC, Hopkinton, MA (US)

(72) Inventors: Angelo E. M. Ciarlini, Rio de Janeiro (BR); Vinícius Michel Gottin, Rio de Janeiro (BR); Rômulo Teixeira de Abreu Pinho, Niteroi (BR); Edward José Pacheco Condori, Rio de Janeiro (BR); Jonas F. Dias, Rio de Janeiro (BR)

(73) Assignee: EMC IP Holding Company LLC, Hopkinton, MA (US)

( * ) Notice: Subject to any disclaimer, the term of this patent is extended or adjusted under 35 U.S.C. 154(b) by 489 days.

(21) Appl. No.: 15/363,318

(22) Filed: Nov. 29, 2016

(51) Int. Cl.
*G06N 7/00* (2006.01)

(52) U.S. Cl.
CPC ................... *G06N 7/005* (2013.01)

(58) Field of Classification Search
CPC .................. G06F 9/4881; G06N 7/005
See application file for complete search history.

(56) References Cited

U.S. PATENT DOCUMENTS

| 6,009,452 A * | 12/1999 | Horvitz | G06F 9/4881 718/102 |
|---|---|---|---|
| 2008/0155550 A1* | 6/2008 | Tsafrir | G06F 9/4881 718/103 |
| 2010/0333105 A1* | 12/2010 | Horvitz | G06F 9/4893 718/105 |
| 2013/0179371 A1* | 7/2013 | Jain | G06F 9/5027 705/400 |

(Continued)

OTHER PUBLICATIONS

Ikeda et al., "Logical provenance in data-oriented workflows?" 2013.

(Continued)

*Primary Examiner* — Austin Hicks
*Assistant Examiner* — Joseph V Nguyen
(74) *Attorney, Agent, or Firm* — Ryan, Mason & Lewis, LLP

(57) ABSTRACT

Methods and apparatus are provided for data operation pre-processing with a probabilistic estimation of operation value. An exemplary method comprises extracting feature values from a data set; identifying a set of operations that previously processed data sets comprising the extracted feature values; determining whether to execute an operation from the set of operations before an explicit request for the execution of the operation based on a probabilistic evaluation of a value of pre-processing the operation; and executing a set of instructions for the operation when it is determined that the operation is to be executed. The set of instructions comprises, e.g., stopping execution of other (Continued)

operations being executed, freeing resources required by the operation, and/or allocating resources required by the operation. An optional indirect component, optionally scaled by a moderating factor, estimates the value of pre-processing one or more additional operations enabled by features of data sets produced by the operation, and the resources to be allocated for the pre-processing of those operations.

20 Claims, 10 Drawing Sheets

(56) References Cited

U.S. PATENT DOCUMENTS

| | | | |
|---|---|---|---|
| 2016/0098662 A1* | 4/2016 | Voss | G06Q 10/06316 705/7.26 |
| 2016/0124770 A1* | 5/2016 | Bouchard | G06N 7/005 718/103 |
| 2017/0139746 A1* | 5/2017 | Maier | G06F 9/4881 |
| 2018/0181641 A1* | 6/2018 | Das | G06K 9/6215 |

OTHER PUBLICATIONS

Pinho et al., "Method and Apparatus for Data Pre-processing in Dataflow Operations", U.S. Appl. No. 15/191,755, filed Jun. 24, 2016.

Dias et al., "Provenance-Oriented Optimization for HPC Workflows" U.S. Appl. No. 14/580,732, filed Dec. 23, 2014.

Ogasawara et al., "Chiron: a parallel engine for algebraic scientific workflows", Concurrency and Computation: Practice and Experience, vol. 25, No. 16, pp. 2327-2341, 2013.

* cited by examiner $preproc\_value(f_i, \Delta_i, \alpha, \Delta_\alpha, R, \mathbb{F}, \mathbb{O}, \mathbb{D}, t_z):$ 1. $\sum_{t_1=1}^{t_z} [\ p\_request(f_i, \Delta_i, \alpha, t_1, \mathbb{F}) \cdot$
2. $\sum_{t_2=1}^{t_z} \{\ p\_finish(f_i, \alpha, \Delta_\alpha, R, t_2) \cdot$
3. $\sum_{f_o \in \mathbb{D}} \langle\ p\_features(f_i, \alpha, f_o) \cdot$
4. $time\_factor(f_o, t_1, t_2) \cdot$
5. $feat\_value(f_o, \mathbb{F}) \rangle \}]$
6. $+ \gamma \cdot$
7. $\sum_{t_3=1}^{t_z} (\ p\_finish(f_i, \alpha, \Delta_\alpha, R, t_3) \cdot$
8. $\sum_{f_o \in \mathbb{D}} [p\_features(f_i, \alpha, f_o) \cdot$
9. $\sum_{\beta \in \mathbb{O}} \sum_{t_4=t_3}^{t_z} \{p\_enabled(\beta, f_o \cup \mathbb{F}, t_3, t_4) \cdot$
10. $preproc\_value\ (f_o, t_4 - t_3, \beta, t_3, res\_avg(\beta, f_o), f_o \cup \mathbb{F}, \mathbb{O}, \mathbb{D}, t_z - t_4)\}])$

FIG. 8

METHODS AND APPARATUS FOR DATA OPERATION PRE-PROCESSING WITH PROBABILISTIC ESTIMATION OF OPERATION VALUE

FIELD

The field relates generally to techniques for pre-processing operations in a workflow environment.

BACKGROUND

Big data dataflows usually correspond to multiple sequences of complex operations that execute transformations over large distributed datasets. When an infrastructure is created for such dataflows, its resources should be sufficient to deal with peaks of demand. Thus, resources are often idle for periods of time. When an operation that will be executed in the future can be pre-processed, taking advantage of such idle resources, there is a potential benefit for the users and the infrastructure management.

U.S. patent application Ser. No. 15/191,755, filed Jun. 24, 2016, entitled "Methods and Appartus for Data Pre-Processing in Dataflow Operations," incorporated by reference herein, discloses a method to leverage idle resources to preemptively execute activities that are likely to be necessary in the future. A need exists for techniques for managing which operations should be preemptively executed, before being explicitly started by a user.

SUMMARY

Illustrative embodiments of the present invention provide methods and apparatus for data operation pre-processing in dataflow operations with a probabilistic estimation of operation value. In one exemplary embodiment, a method comprises the steps of extracting feature values from a data set; identifying a set of operations that previously processed data sets comprising the extracted feature values; determining whether to execute at least one operation from the set of operations before the execution of the at least one operation is explicitly requested based on a probabilistic evaluation of a value of pre-processing the at least one operation; and executing a set of instructions for the at least one operation, wherein the set of instructions includes a proactive execution of the at least one operation before the execution of the at least one operation is explicitly requested, when the determining step determines that the at least one operation is to be executed.

In one or more embodiments, the set of instructions further comprises stopping execution of one or more of other operations being executed, freeing one or more resources required by the at least one operation, and/or allocating one or more of the resources required by the at least one operation.

In at least one embodiment, the probabilistic evaluation of a value of pre-processing comprises (i) a probabilistic assessment of the at least one operation being requested at one or more specific times within a predefined time frame (for example, based on a time interval during which the data set with the extracted feature values has been available and/or a set of features of available data sets); (ii) a probabilistic assessment of the at least one operation finishing pre-processing at one or more specific times within a predefined time frame (for example, based on an estimation of computational resources to be allocated for the execution of the pre-processing of the at least one operation and/or a time interval during which the at least one operation has been executing); (iii) a probabilistic assessment of possible features of the data sets produced by the at least one operation with an assignment of a pre-processing value to each possible feature; and/or (iv) a scaling factor that considers the relation between a time in which the at least one operation finishes pre-processing and a time in which the at least one operation is requested.

In one or more embodiments, the probabilistic evaluation of a value of pre-processing comprises an indirect component based on a probabilistic assessment of the at least one operation finishing pre-processing at each specific time within a predefined time frame; a probabilistic assessment of possible features of the data sets produced by the at least one operation; a probabilistic assessment of a value of pre-processing one or more additional operations enabled by features of data sets produced by the at least one operation; and/or a moderating factor applied to one or more of said probabilistic assessments. In at least one embodiment, the indirect component estimates resources to be allocated for the pre-processing of the one or more additional operations enabled by features of data sets produced by the at least one operation.

As noted above, illustrative embodiments described herein provide significant improvements relative to conventional workflow environments by pre-processing data in dataflow operations. These and other features and advantages of the present invention will become more readily apparent from the accompanying drawings and the following detailed description.

BRIEF DESCRIPTION OF THE DRAWINGS

FIG. 8 illustrates exemplary pseudo code of a pre-processing valuation method, according to one embodiment of the invention;

DETAILED DESCRIPTION

Figure 1:
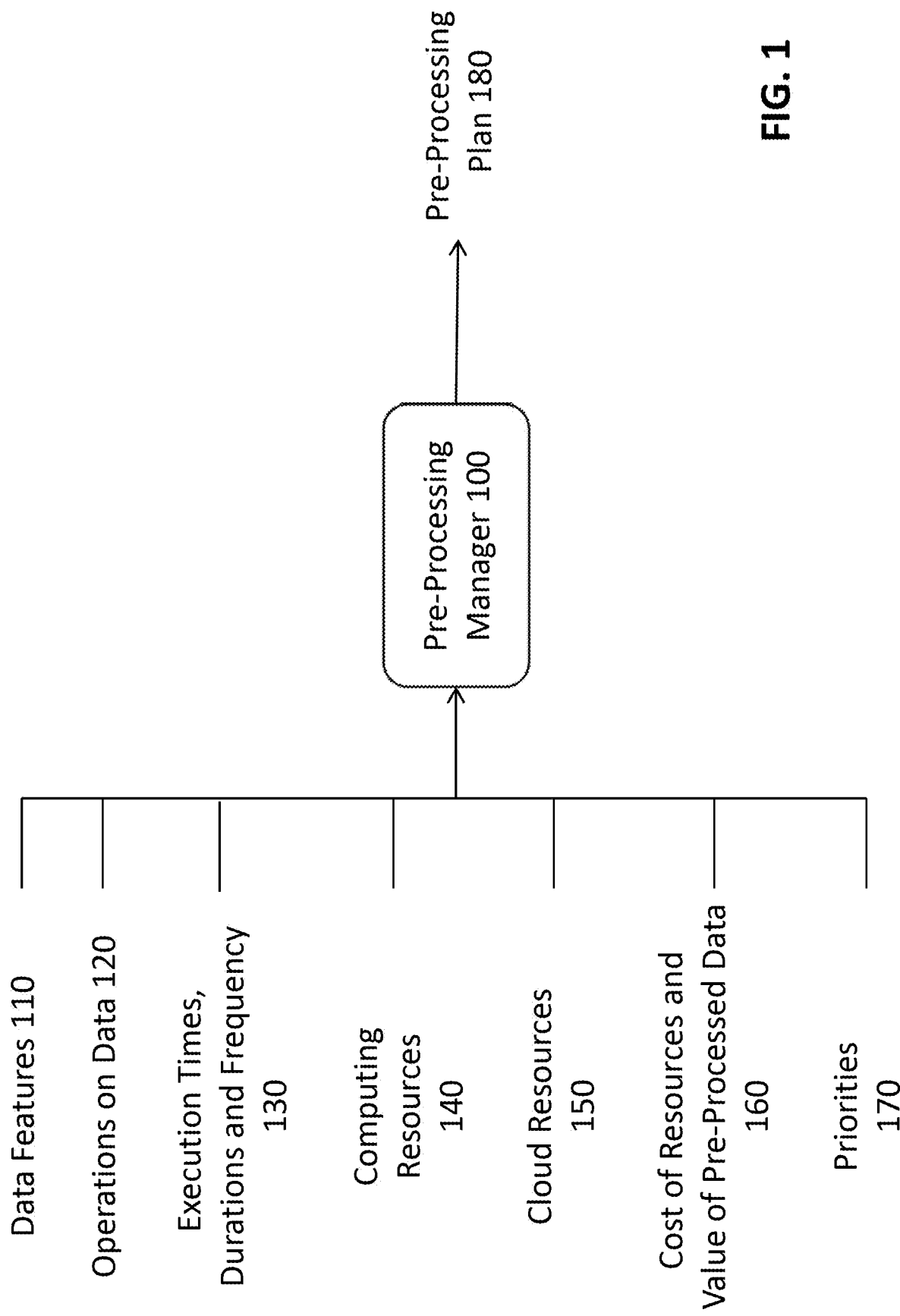
FIG. 1 illustrates an exemplary pre-processing manager according to one embodiment of the invention that collects various data to generate and execute pre-processing plans for the execution of processing operations in high performance computing (HPC) workflows.

Illustrative embodiments of the present invention will be described herein with reference to exemplary communication, storage, and processing devices. It is to be appreciated, however, that the invention is not restricted to use with the particular illustrative configurations shown. Aspects of the present invention provide methods and apparatus for data pre-processing in dataflow operations with a probabilistic estimation of operation value.

One or more embodiments of the invention provide methods and apparatus for data operation pre-processing with a probabilistic estimation of operation value. At least one embodiment of the invention estimates the value of potential pre-processing operations and ranks the potential pre-processing operations.

In one or more embodiments, a set of prediction functions are systematically computed, based on provenance data from previous executions. Such functions are then combined as part of a pre-processing valuation method (FIG. 8) to assign a potential value to operations that can be preemptively executed, for example, as their input data sets become available. One or more embodiments of the invention address the problem that new pre-processing jobs need to be compared with pre-processing jobs being executed as it might be worthwhile to interrupt a job being executed and allocate its resources to another one that is more promising.

In one or more embodiments, a method is provided to estimate the value of pre-processing operations in a certain context. The value of pre-processing an operation can be used to compose a substantially optimal pre-processing strategy. One or more embodiments of the invention address the following challenges:

Stochastic Domain—The value of pre-processing an operation depends on various factors that are not known a priori and do not follow directly from the context. The value of pre-processing the operation depends on it being requested in the future, on the availability of resources and on the time it takes to compute. In addition, the value of pre-processing the operation depends on the features of the output that might not be completely known, and also depends on the features of its input.

Evaluation of Operations Being Executed—As the context evolves, one or more aspects of the invention recognize that an operation that is currently being pre-processed may no longer be considered as valuable as other operations. If another operation becomes more valuable, one strategy may involve suspending one operation in favor of the more valuable operation. Thus, operations currently executing and operations not yet running should be considered.

Time Windows—One or more aspects of the invention recognize that an operation that finishes pre-processing before it is requested has the potential to be more valuable than an operation that can only be partially pre-processed. Furthermore, it is necessary to restrict the value of pre-processing operations to a relevant time window. The method must deal with the temporal aspect of the domain within a user-specified time window.

Indirect Value of Pre-Processing an Operation—Besides the direct value of pre-processing an operation, one or more aspects of the invention recognize that an operation can generate an output that enables the pre-processing of other valuable operations. This may aggravate the stochastic aspects of the domain, and may demand a way of dealing with increasing uncertainty as cumulative indirect values are considered.

As noted above, U.S. patent application Ser. No. 15/191,755, filed Jun. 24, 2016, entitled "Methods and Appartus for Data Pre-Processing in Dataflow Operations," incorporated by reference herein, discloses a pre-processing manager that launches operations before an execution request as part of the workflow. In one or more embodiments, this pre-processing mechanism considers features of the data to be processed, the benefit of the output of an operation and the availability of computing resources in order to devise an execution plan to generate the output of an operation ahead of time. The procedure to decide what operations will be run is defined by a model construction and a model application.

One exemplary model construction tracks data processing operations. The exemplary pre-processing manager uses this information to decide what to do with a newly available dataset. The exemplary model construction is composed by a feature value extractor (FVE), a probability model, and a resource use model.

With the patterns that are learned as operations are executed on available data, the pre-processing manager can decide if and how to run any operations on the data before the operations are actually launched by the user, referred to as Model Application. This model application is subdivided into the generation of a pre-processing plan when new data is available and the execution of the plan on the existing computing infrastructure.

The exemplary pre-processing manager is discussed further below. As discussed further below, a pre-processing plan generation process 700, as discussed further below in conjunction with FIG. 7, gathers information about the operations currently running and the amount of resources available in the system. The pre-processing plan generation process 700 processes received information in order to decide whether to run any of the operations associated with the input features of a new dataset.

In accordance with one or more embodiments of the present invention, the exemplary pre-processing plan generation process 700 sorts the candidate operations according to their value, which assigns a relative importance to the operation and might depend on a number of factors, as discussed further below in conjunction with FIG. 8. The pre-processing plan generation process 700 then evaluates the available resources and compares the value of new candidate operations with those of the operations that are currently running. If the pre-processing plan generation process 700 determines that running any of the selected operations in advance has a higher priority for the end user, the pre-processing plan generation process 700 may decide to free resources currently in use by other operations. Alternatively, the pre-processing plan generation process 700 may decide that it is beneficial to run the selected operations with fewer resources than what the pre-processing plan generation process 700 has learned, or even to allocate extra cloud resources if the cost of doing so is within the budgetary restrictions.

The output of the pre-processing plan generation process 700 is a Pre-Processing Plan (PPP) for each operation, which contains the instructions to run the operation with the correct resource allocation parameters. Note that these instructions also have an intrinsic cost of execution. Data transfers to the cloud, for example, might take long to run. Such costs are taken into account by the pre-processing plan generation process 700 as well. Note also that, in one or more embodiments, the decisions of the pre-processing manager only affect the operations that the pre-processing manager launched itself and do not interfere with operations that the user launches directly. In such an embodiment, the pre-processing manager assumes that operations launched by the user always have the highest priority, especially because the execution patterns of those operations are the basis for the continuous learning process of the pre-processing manager.

One or more embodiments of the invention address the challenges of assigning value to the pre-processing of an operation taking into account the uncertainty.

PRE-PROCESSING MANAGER

FIG. 1 illustrates an exemplary pre-processing manager 100 according to one embodiment of the invention that collects various data 110, 120, 130, 140, 150, 160, 170 in order to generate and execute pre-processing plans 180 for the substantially optimal execution of processing operations in HPC workflows. Generally, the exemplary pre-processing manager 100, discussed further below in conjunction with FIG. 2, generates and executes the pre-processing plan 180 for each newly available data set. The exemplary pre-processing manager 100 creates a database with the information necessary to build one or more models for the generation of the pre-processing plans 180.

As shown in FIG. 1, the exemplary pre-processing manager 100 processes data features 110, as discussed further below in conjunction with FIG. 3; operations on data 120, as discussed further below in conjunction with FIG. 4; execution times, durations and frequency 130, as discussed further below in conjunction with FIG. 5; computing resources 140 and cloud resources 150, as discussed further below in conjunction with FIG. 6; cost of resources and value of pre-processed data 160, as discussed further below in conjunction with FIG. 6 and in a section entitled "Value of Pre-Processed Data;" and priorities 170 (such as low, medium or high priority, which can be inferred, for example, from data availability and operation execution times).

As discussed hereinafter, in one or more exemplary embodiments, the pre-processing manager 100 learns execution patterns from operations 120 executed directly by the end user. Despite the fact that these operations 120 might be executed in the context of scientific workflows, the pre-processing manager 100 does not depend on any formal workflow definition (rather, the exemplary pre-processing manager 100 tracks individual operation executions). In this manner, the exemplary pre-processing manager 100 detects patterns without a formal workflow definition.

With such tracking, the pre-processing manager 100 can determine which data sets are fed to which operations 120, at which time, what are the output data sets, and if and how those outputs are fed to any other application. Ultimately, the pre-processing manager 100 dynamically tracks the dataflows affecting substantially all data sets within the system and stores those dataflows in its database in order to subsequently aid the decision making process.

Model Construction

The exemplary pre-processing manager 100 aims to make the whole data processing system autonomous (e.g., in one or more embodiments, substantially no user intervention is needed to decide what to do with any newly available data set). Data is made available to the pre-processing manager 100 via regular ingests or as the output of any processing operation. In order to be able to decide when it is appropriate to run a certain data processing operation 120 ahead of its expected execution, the exemplary pre-processing manager 100 tracks substantially all data processing operations 120 within the infrastructure where it has been deployed. These data processing operations 120 can even be launched as part of the execution of formal scientific workflows, but not necessarily. The pre-processing manager 100 learns which operations 120 are executed by end users and the characteristics of the associated data sets as those operations are launched individually, as discussed further below in conjunction with FIGS. 3-6.

Figure 2:
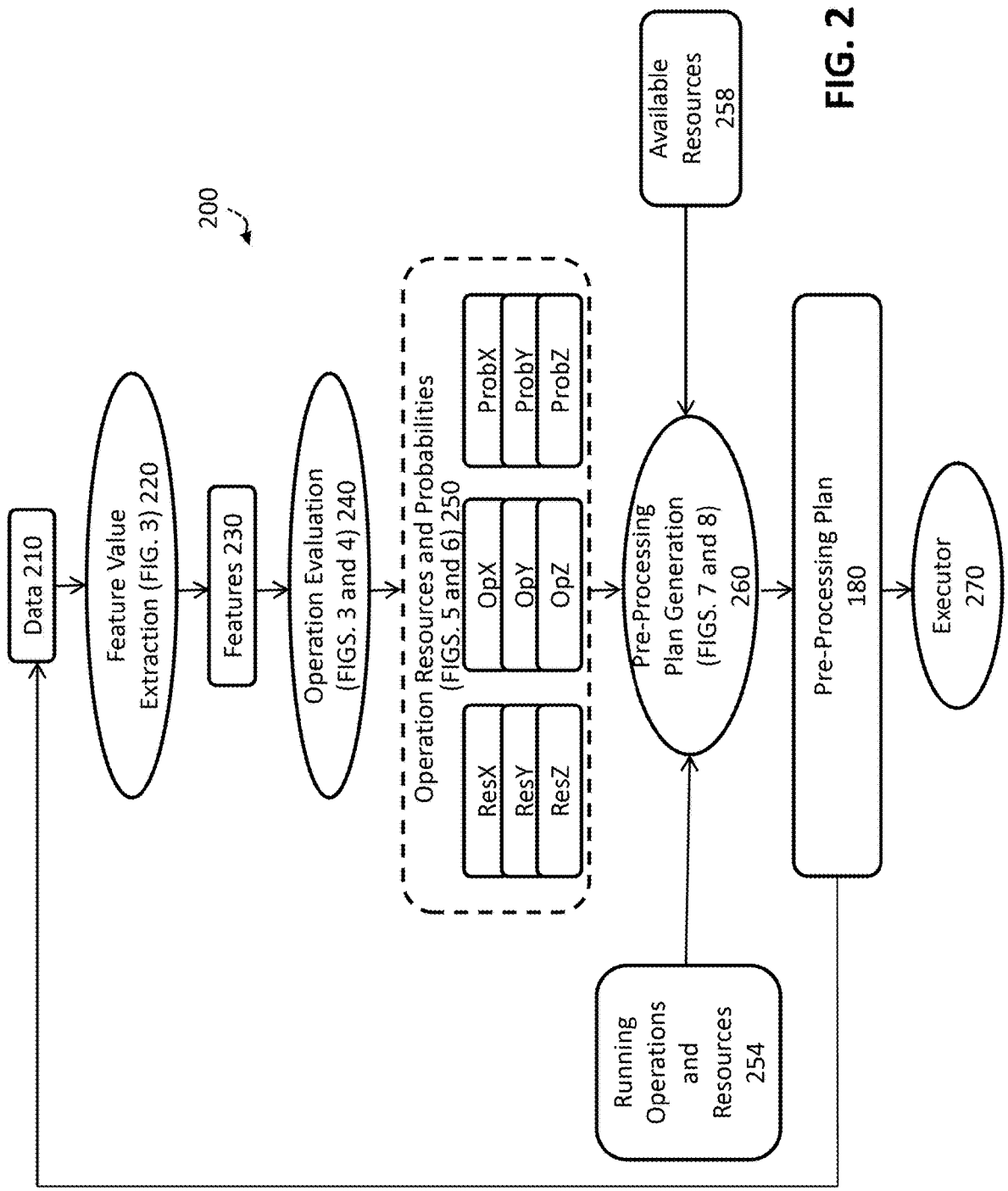
FIG. 2 is a flow chart illustrating an exemplary implementation of a pre-processing management process, according to one embodiment of the invention.

FIG. 2 is a flow chart illustrating an exemplary implementation of a pre-processing management process 200 according to one embodiment of the invention. As shown in FIG. 2, the exemplary pre-processing management process 200 is initiated upon the receipt of new data 210. The exemplary pre-processing management process 200 performs feature value extraction, as discussed further below in conjunction with FIG. 3, during step 220 to extract a set of features 230.

The exemplary pre-processing management process 200 performs an operation evaluation during step 240, as discussed further below in conjunction with FIGS. 3 and 4, to determine operation resources and probabilities 250, as discussed further below in conjunction with FIGS. 5 and 6.

Figure 7:
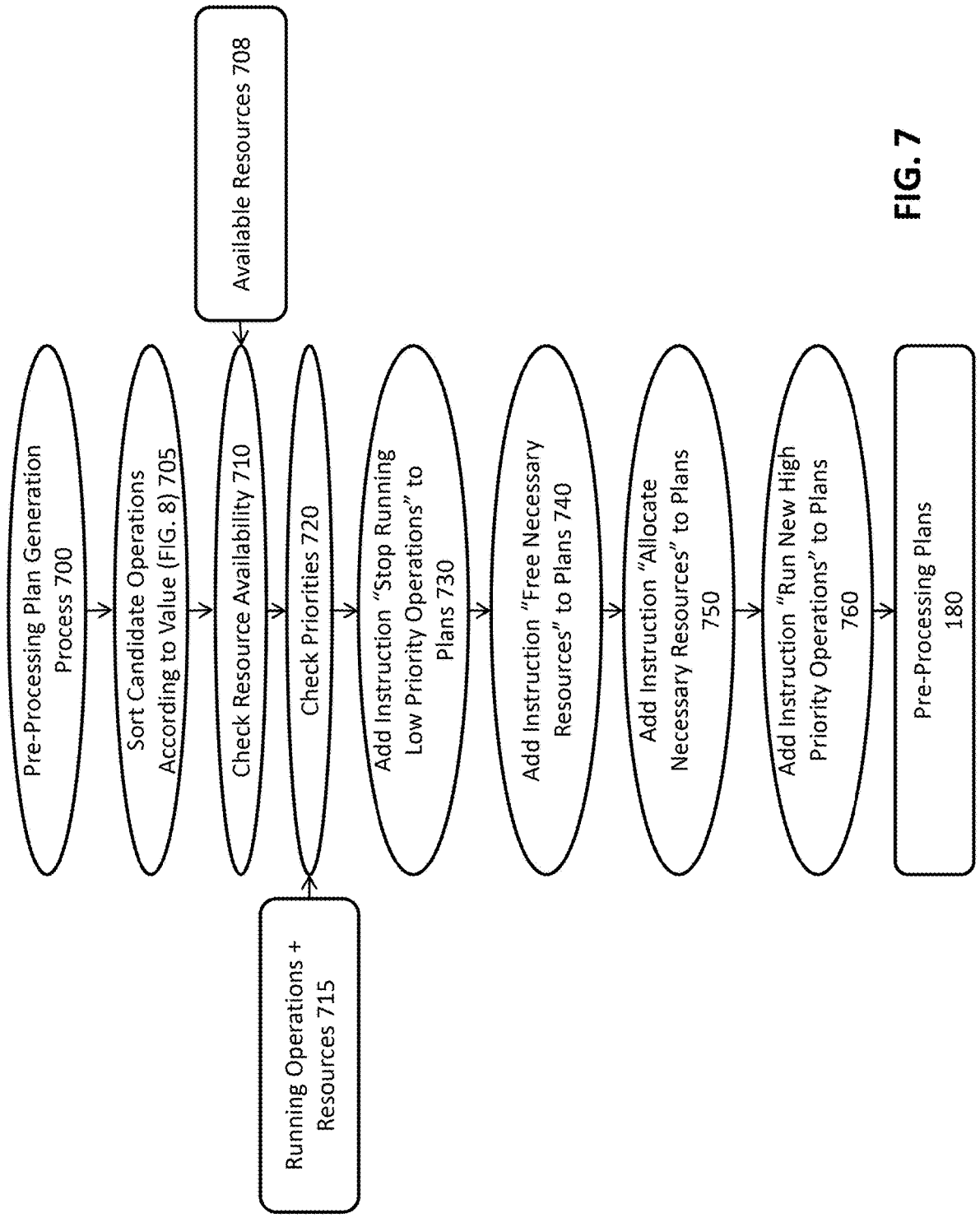
FIG. 7 is a flow chart illustrating an exemplary implementation of a pre-processing plan generation process, according to one embodiment of the invention.

A pre-processing plan generation process, discussed further below in conjunction with FIGS. 7 and 8, is executed during step 260 and processes running operations and resources 254 and available resources 258, as inputs. The pre-processing plan generation process generates the pre-processing plan 180, which is applied to an executor 270, and can also be applied in a feedback manner with new data 210.

Data Features and Feature Value Extraction

Figure 3:
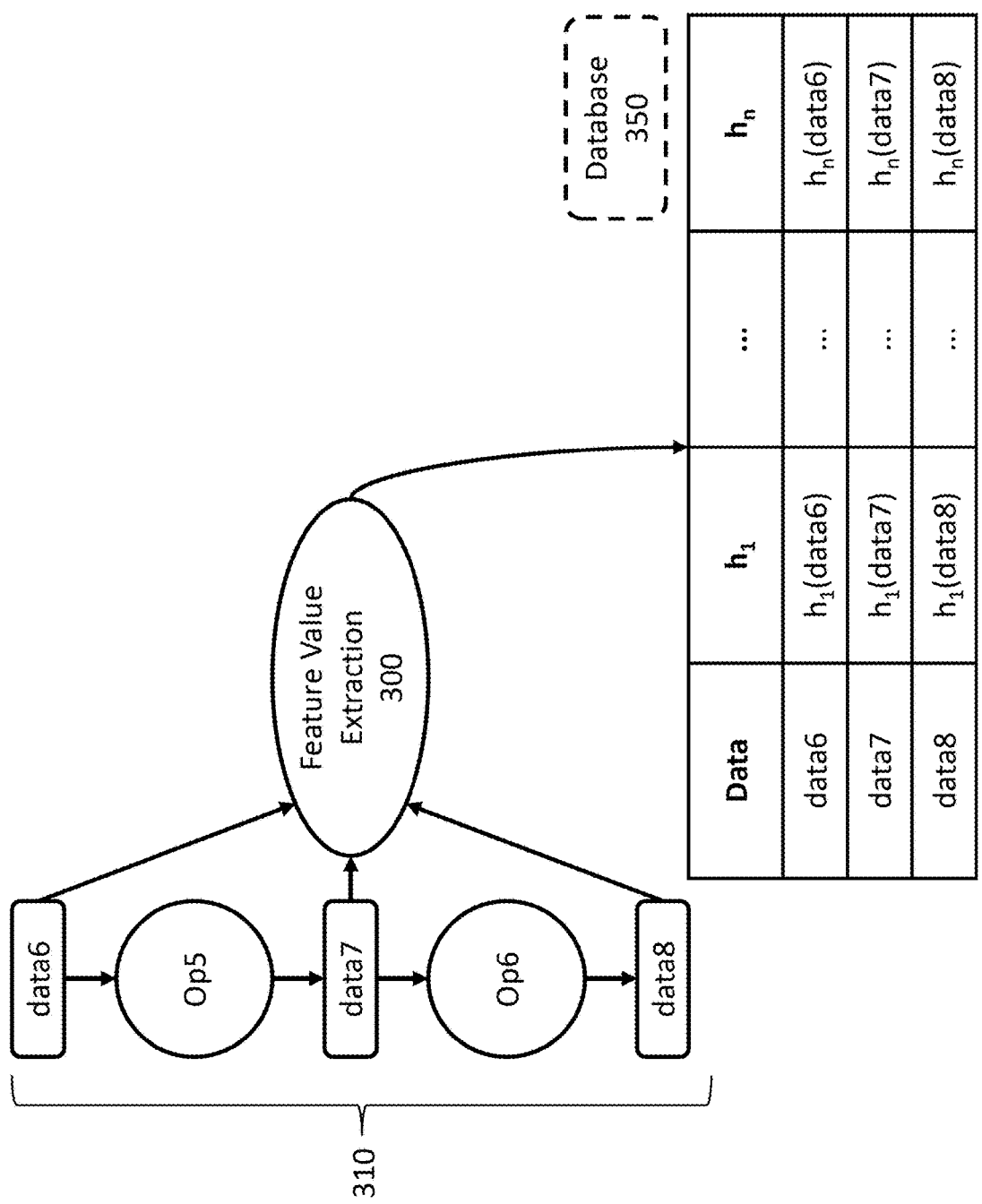
FIG. 3 illustrates an exemplary feature value extraction (FVE) module that computes and extracts values of a plurality of data features from a data set, according to one embodiment.

FIG. 3 illustrates an exemplary feature value extraction (FVE) module 300 that computes and extracts values of a plurality of data features 110 from a data set 310 according to one embodiment. In one exemplary embodiment, the feature value extraction module 300 is implemented as a learning stage that learns which features 110 are processed by each operation 120.

In order to run operations 120 on data sets, such as data set 310, automatically, the pre-processing manager 100 must know which characteristics (referred to herein as data features 110) of each data set 310 trigger which operations 120. A data feature 110 can be an attribute or a combination of different attributes.

For example, data mining on log files typically depends on transforming the text present in the log files into a more structured format, such as tables used in SQL-based systems. Such transformation might require a lot of effort if the log is unstructured, badly formatted, incomplete, or requires any data cleaning operations. Being able to automatically measure the quality of formatting, of the structuring and the cleanness is thus important in deciding which operations 120 to run. In this case, 'formatting_quality', 'completeness' or 'data_quality' could be considered data features 110.

As shown in FIG. 3, a feature table definition (FTD) database 350 is created that comprises domain-specific features $h_1$ through $h_n$ that the exemplary pre-processing manager 100 must extract from a data set 310 ingested by the system. For example, a system or data administrator may decide that data sets type "A" are comma-separated values (CSV) text files with column "$col_i$" among others, and feature $h_1$ (data_A) is the average of the values of all $col_i$ instances. As another example, data set type "B" may be a GreenPlum® Database table with name "X", and feature $h_2$ (data_B) may be a logical expression that evaluates to true if the number of records in this database is greater than a predefined threshold.

In one or more embodiments, the exemplary domain-specific feature value extraction module 300 embeds algorithms to compute and extract the values of the features specified in the feature table definition database 350. The exemplary feature value extraction module 300 connects to the feature table definition database 350 and populates the features table with the required values. Initially, the features table is empty. As data becomes available, either through data ingestion or as the output of a certain processing operation 120, the exemplary pre-processing manager 100 triggers the execution of the feature value extraction module 300. The exemplary feature value extraction module 300 identifies the data set type according to the feature table definition database 350 and launches the required algorithms in order to obtain the feature values and populate the features table 350, as shown in FIG. 3.

Relationships Between Features and Operations

The definition of the data features and the deployment of the feature value extraction module 300 are the first steps to enable the pre-processing manager 100 to orchestrate the creation and execution of pre-processing plans 180. In the early stages of system utilization, however, the pre-processing manager 100 must learn from users the relationship between data features 110 and operations 120, as stated previously. Each time a user picks a data set 310 to run an operation 120, the pre-processing manager 100 records this action, i.e., which operation used which data set. Note that, even if the operations are chained, the workflow concept does not formally exist for the exemplary implementation of the pre-processing manager 100. As stated previously, the pre-processing manager 100 registers on its database which data set 310 was utilized by which operation 120.

Figure 4:
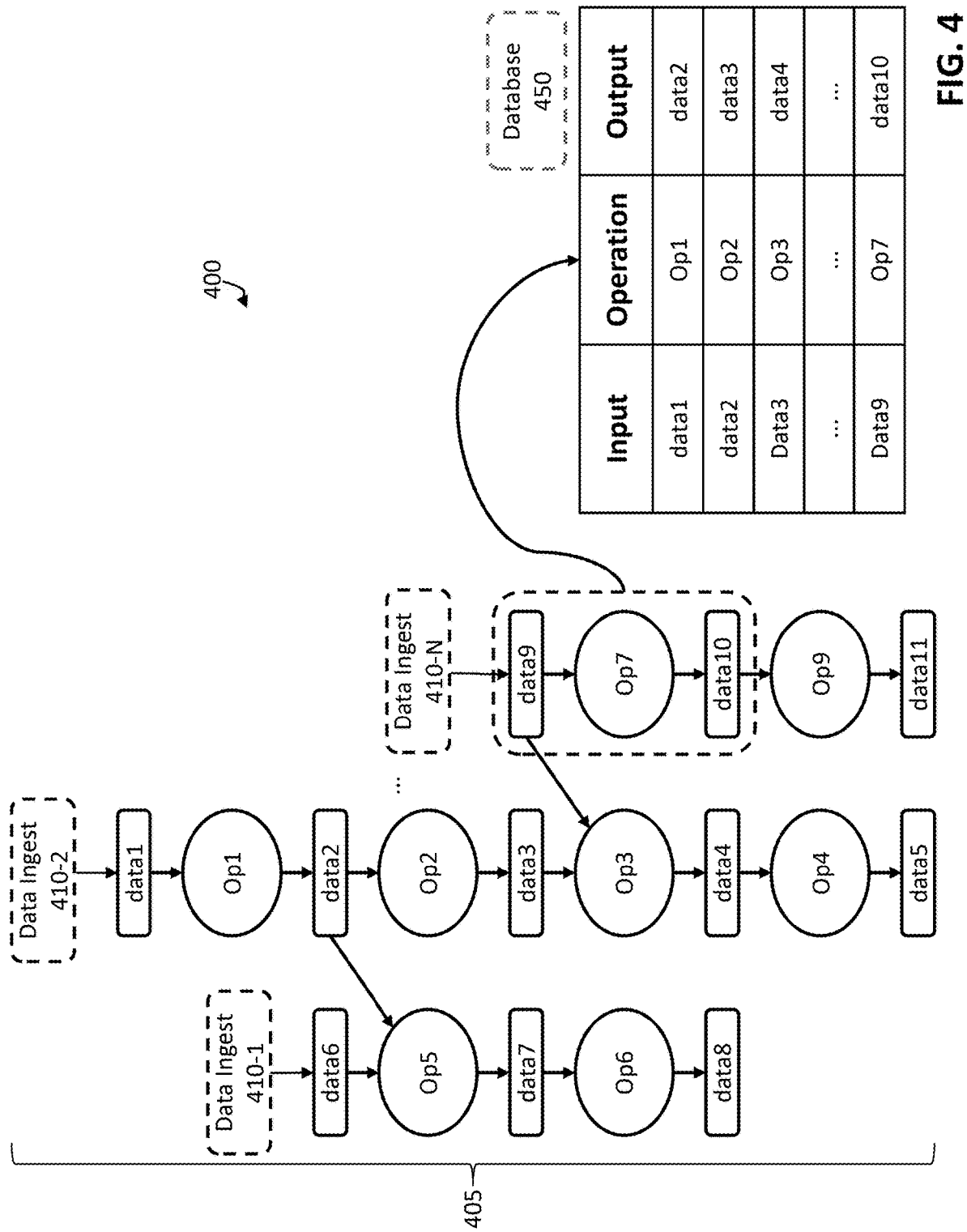
FIG. 4 illustrates exemplary processing of an operation tracking module that tracks the executions of processing operations.

FIG. 4 illustrates exemplary processing of an operation tracking module 400 that tracks the executions of processing operations. The exemplary operation tracking module 400 builds a data-flow graph 405 indicating which operations 120 were executed on which ingested data sets 410-1 through 410-N. The exemplary operation tracking module 400 performs the dynamic construction of the various data-flows in the data-flow graph 405 related to the execution of all operations 120 in the system.

In one or more embodiments, the exemplary operation tracking module 400 embeds algorithms to track the executions of processing operations compute and to extract the particular operations 120 that are executed on each data value, for storage in an operation database 450. For each operation 120 that is tracked by the exemplary operation tracking module 400, the input data and output data is recorded in the operation database 450.

Thus, in at least one exemplary embodiment, after each operation 120 executes, the pre-processing manager 100 will have stored, among other provenance data:
input data set type;
input data set instance name;
feature values of the input data set;
operation that used the data set; and
output data set.

It is noted that while the feature table definition database 350 and the operation database 450 are shown as distinct databases in FIGS. 3 and 4, these databases 350, 450 can be combined into a single database, as would be apparent to a person of ordinary skill in the art.

Modeling the Probability of Execution of Processing Operations

In conjunction with knowing which operations 120 are executed on a particular data set (FIG. 4), in one or more embodiments, the pre-processing manager 100 needs to know the best moment to trigger them in order to generate a pre-processing plan 180. This is associated with the probability of executing a certain operation 120 on a certain data set 410 when the data is available. This probability, in turn, can be derived from characteristics of the execution of the operations 120, such as execution time, duration and frequency, and also from user-provided information, such as the importance (or subjective value) of running a certain operation ahead of time whenever possible, as described next.

A. Execution Times, Durations and Frequency

Figure 5:
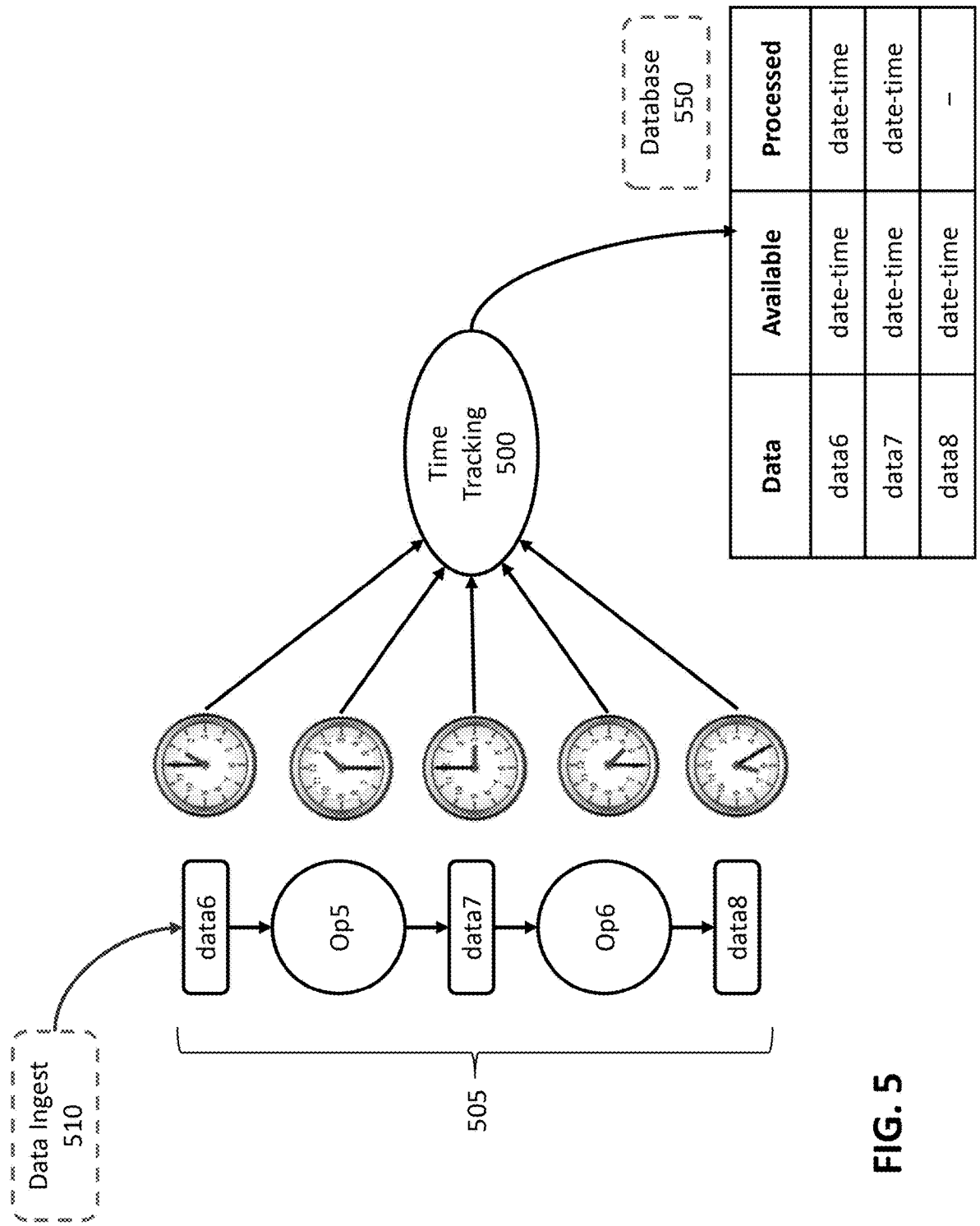
FIG. 5 illustrates exemplary processing of a time tracking module that tracks data availability and operation execution time.

FIG. 5 illustrates exemplary processing of a time tracking module 500 that tracks data availability and operation execution time. As noted above, such data can be used to infer the probabilities of execution of each operation 120 on certain types of data and also the priority with which those operations were executed. As shown in FIG. 5, upon an ingestion of data 510, the exemplary time tracking module 500 builds a data-flow graph 505 indicating which operations 120 were executed on which ingested data sets 410, in a similar manner as FIG. 4.

Along with the data collected during the dynamic building of dataflows (FIG. 4), the exemplary time tracking module 500 can gather information about execution times, durations and frequency 130, for example:
1) how quickly operations 120 on data 410 are executed after the data is available;
2) how frequently those operations 120 are executed; and
3) how long the executions last.

Such timing information can be stored in a timing database 550, as illustrated in FIG. 5, and generally indicates:
1) The probability of execution of a certain operation 120 on a data set 410 with a certain set of characteristics, which is directly proportional to the frequency of execution of the operations 120 (i.e., more frequent operations have higher probability);
2) The priority in the execution of a certain operation 120 on a data set 410 with a certain set of characteristics, which is inversely proportional to the average interval between data availability and operation execution (i.e., short intervals naturally lead to higher priorities); and
3) The amount of user time that can be saved if the operation is executed in advance, which is directly proportional to the average duration of the operations (i.e., longer operations potentially benefit from being executed ahead of time).

B. Value of Pre-Processed Data

In addition to what can be learned directly from tracking the different times and frequencies related to the execution of operations 120 on available data 410, as shown in FIG. 5, the exemplary pre-processing manager 100 can affirmatively receive user parameters that assign priorities 170 to certain operations 120. For example, imagine that certain operations 120 are executed very infrequently and usually not immediately after the data set(s) 410 they need become available. If only the time and frequency information 130 were used, the pre-processing manager 100 would learn that such operations 120 have little probability of being executed and they would naturally go down in the priority scale 170. Imagine, however, that, despite being time consuming operations 120, the user knows that they are very important and that they need to be executed with high priority whenever required. Being able to have the output available in advance would certainly have high value for the user in this situation.

C. Feedback from Processing Queues

The execution of applications in HPC environments is often managed by a job scheduling system, such as the Portable Batch System (PBS), from Altair Engineering, Inc. Every operation (or job) that is to be executed in the HPC environment is submitted to the scheduler's queue, with the required resources. As soon as the required resources are free, the scheduler satisfies the requests on a first-come first-served basis.

The exemplary pre-processing manager 100 can further benefit from information provided by the job scheduler in order to derive the priorities 170 of executions of operations 120 upon the availability of a new data set 410. For example, if an operation 120 associated with the data features is already in the job queue, the pre-processing manager 100 naturally assigns higher priority to it, which can be, for example, proportional to the location of the job in the queue. Operations 120 that are not in the queue will naturally have lower priority.

In one or more embodiments, the pre-processing manager 100 combines what it learns from the information gathered during the execution of the operations 120, what the user provides as parameters for the system and any information it can gather from other elements present in the execution environment, such as job scheduler. This leads to the construction of a probabilistic model to determine which operations 120 should be run in advance based on the characteristics of the data that become available.

Modeling the Use of Resources

Figure 6:
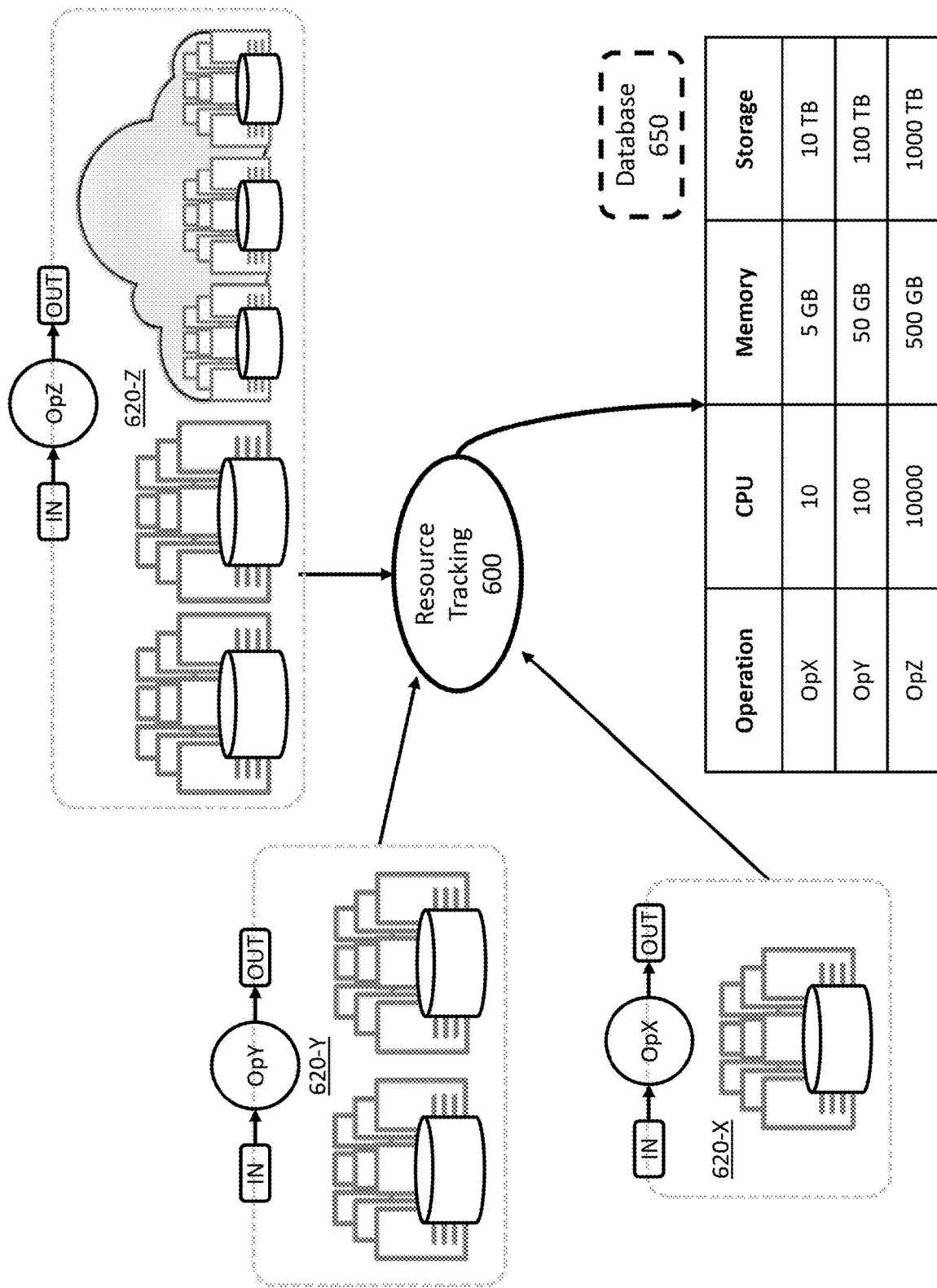
FIG. 6 illustrates exemplary processing of a resource tracking module (RT) that tracks the resources used by each operation.

FIG. 6 illustrates exemplary processing of a resource tracking module (RT) 600 that tracks the resources 140, 150 used by each operation 120. Thus, the exemplary resource tracking module 600 learns how operations 120 (such as operations OpX, OpY and OpZ) consume computing resources 620 (such as resources 620-X for operation X, resources 620-Y for operation Y and resources 620-Z for operation Z). In one or more embodiments, the resource consumption information is processed by the exemplary pre-processing manager 100 to analyze the impact of launching an operation 120 ahead of time, with respect to other running operations 120 and to the available resources 140, 150.

The exemplary resource tracking module 600 is responsible for tracking the resources used by applications and storing the related parameters in a resource database 650, as illustrated in FIG. 6. For example, the metadata tracked in the resource database 650 may relate to the number of CPU cores, amount of memory, disk space, and networking utilization.

Additionally, the resource tracking module 600 can learn patterns of cloud resource use, if the resource tracking module 600 is integrated with cloud service providers. For example, operation Z in FIG. 6 is an example of such a pattern that includes cloud resource use. In this case, the exemplary resource tracking module 600 also needs:

1) information about the direct (or monetary) costs associated with using each cloud resource (e.g., cost-per-CPU ($/CPU), or cost-per-storage unit ($/GB));
2) information about the indirect (or operational) costs associated with using each cloud resource (e.g., data transfer rates); and
3) user-defined parameters for budgetary restrictions, in order to limit the amount of external resources requested.

Note that the cost parameters of different providers can be stored by the exemplary pre-processing manager 100. In one or more embodiments, the pre-processing manager 100 can "bargain" for the best service when deciding to launch a certain operation 120 ahead of time.

Model Application

Using the patterns that are learned as operations are executed on available data, during the model construction phase, the pre-processing manager 100 can decide if and how to run any operations 120 on the data before the operations 120 are actually launched by the user, during a model application phase. In one or more embodiments, the model application is subdivided into the generation of a pre-processing plan 180 when new data is available and the execution of the plan 180 on the existing computing infrastructure, as discussed hereinafter.

Generating Pre-Processing Plans

The generation of a pre-processing plan 180 is a direct application of the models that are built and updated as operations 120 are executed on available data. In practice, whenever a new data set 410 is available, either through an ingest operation or as the output of the execution of a data processing operation 120, the pre-processing manager 100 analyzes whether any operation 120 should be triggered to pre-process that data set 410 before its actual execution is requested by the user.

As discussed above in conjunction with FIG. 2, the exemplary pre-processing manager 100 monitors the availability of new data sets in the system. When the pre-processing manager 100 identifies that new data is available, the feature value extraction module 300 (FIG. 3) is launched to extract the feature values 110 that need to be assessed. The features 110 are provided to the operation evaluation module 400, which obtains the operations associated with the input features, along with the likelihood of their execution (derived from the timing, priority, and value information obtained in conjunction with FIG. 5) and the typical amount of resources they require (FIG. 6).

FIG. 7 is a flow chart illustrating an exemplary implementation of a pre-processing plan generation process 700, according to one embodiment of the invention. As shown in FIG. 7, the exemplary pre-processing plan generation process 700 sorts the candidate operations according to the value assigned by the exemplary pre-processing valuation method 800 (as discussed below in conjunction with FIG. 8) during step 705 and checks the resource availability during step 710 of available resources 708. Thereafter, priorities of running operations and resources 715 are checked during step 720.

During step 730, the exemplary pre-processing plan generation process 700 adds an instruction to "Stop Running Low Priority Operations" to the pre-processing plans 180.

An instruction "Free Necessary Resources" is added to the pre-processing plans 180 during step 740. An instruction "Allocate Necessary Resources" (for the new high priority operations to be pre-processed) is added to the pre-processing plans 180 during step 750. An instruction "Run New High Priority Operations" is added to the pre-processing plans 180 during step 760. Finally, the pre-processing plans 180 are then made available.

The output of the exemplary pre-processing plan generation process 700 is the pre-processing plan (PPP) 180 for each operation 120, which contains the instructions to run the operation 120 with the correct resource allocation parameters. Note that these instructions also have an intrinsic cost of execution. Data transfers to the cloud, for example, might take a long time to run. Such costs are taken into account by the pre-processing manager 100 as well. In one or more embodiments, the decisions of the pre-processing manager 100 only affect the operations that the pre-processing manager 100 launched itself (and do not interfere with operations that the user launches directly). Thus, the pre-processing manager 100 assumes that operations 120 launched by the user always have the highest priority, especially because the execution patterns of those operations are the basis for the continuous learning process of the pre-processing manager 100. Eventually, the pre-processing plan 180 is passed on to the executor module 270 (FIG. 2).

In one exemplary embodiment, the pre-processing manager 100 sorts the candidate operations 120 relative to their probability of being executed on the ingested data set. The pre-processing manager 100 then evaluates the available resources 140, 150 and whether any of the currently running operations 715 has lower priority 170 than the operations 120 to be executed on the input data set. If the pre-processing manager 100 determines that running any of the selected operations in advance has higher priority 170 for the end user, the pre-processing manager 100 may decide to stop the low priority operations (Step 730) and free resources (Step 740) currently in use by other operations. Alternatively, the pre-processing manager 100 could decide that it is beneficial to run the selected operations with fewer resources than what the pre-processing manager 100 has learned, or even to allocate extra cloud resources 150 if the cost of doing so is within the budgetary restrictions.

Generally, for each operation retrieved from the database, the exemplary pre-processing manager 100 checks whether the required resources are available (e.g., local resources 140 and/or Cloud resources 150) and evaluates the priority of the operation against the priority of the running operations 715. The instructions for freeing resources and running the selected operations are added to the respective pre-processing plans 180 accordingly, as discussed above in conjunction with FIG. 7.

Executing Pre Processing Plans

As noted above, the pre-processing plan 180 is passed to the executor module 270 (FIG. 2) for execution. Generally, the executor module 270 serves as the arms and legs of the pre-processing manager 100. The executor module 270 materializes the instructions included in the pre-processing plan 180. The executor module 270 works as an intelligent resource manager that has knowledge about the available resources in the infrastructure managed by the pre-processing manager 100 and knows how to allocate them and launch applications that use those resources.

The executor 270 is generally similar to a cloud management system typical of Platform-as-a-Service (PaaS) deployments. The executor 270 knows how to request to the underlying resource managers the required number of CPUs and the amount of memory and storage to run a certain operation, including cloud-based resources 150. Once the executor 270 checks that the required resources are available, the executor 270 runs the operation specified in the pre-processing plan 180, which in turn generates the output data sets. In the end, the pre-processing manager 100 identifies that a new data set is available as the output of a pre-processing operation, and the whole process restarts.

Note that the execution of the pre-processing plan 180 can be carried out even if, eventually, the outputs of the operations 120 selected by the pre-processing manager 100 are not used. The pre-processing manager 100 infers the probabilities of execution of operations based on data gathered from past executions. It is noted that any data generated by the execution of an operation 120 in advance consumes storage resources. It is optionally part of the execution of a pre-processing plan 180 to carry out any cleaning operation to remove data that has not been used by any operation 120, as would be apparent to a person of ordinary skill in the art.

Valuing Automatic Data Pre-Processing

One or more embodiments of the invention provide a method for computing the value of pre-processing an operation in an environment where multiple operations are enabled by the available datasets. In at least one embodiment, the exemplary method estimates the value of pre-processing all enabled operations, based on a set of probabilistic functions that model how the context behaves. The exemplary method is also capable of estimating the value of operations being executed.

In one or more embodiments, the estimation of the value of pre-processing available datasets by means of enabled operations takes into account the resources for their execution and provenance data from previous executions. The estimation also considers dependencies between operations, expressed by the input and output features present in the datasets they consume and generate, so that the value of chains of pre-processing operations can be considered. It is assumed that any dataset can be represented by a group of features that are present in that dataset. In this way, a reference to a group of features is an implicit reference to the dataset in which those features are present.

In at least one embodiment, the value of pre-processing an operation also considers the temporal aspect, as pre-processing an operation is more valuable if the operation is likely to be already finished by the time a user requires its execution. Provenance data is used to estimate the likelihood that each operation has of being explicitly executed by the user and of finishing at specific times. Finally, that value also depends on the features of the output datasets.

Probabilistic Functions

One or more embodiments of the invention employ a set of probabilistic functions that probabilistically model how the context may behave. These exemplary functions can be defined in relation to provenance and telemetry data in real-world implementations.

The disclosed functions are used to evaluate the value of pre-processing operations at any given time, in the context of a computational environment with either limited or elastic availability of resources. While the exemplary embodiments employ a discrete representation of time, so that probabilities can be assigned to specific time slots, an implementation considering continuous time could directly be derived from the present description, as would be apparent to a person of ordinary skill in the art.

The disclosed functions also consider an enumeration of the groups of features that are possibly present in any given dataset. The disclosed functions also consider an enumeration of the groups of resources that can be assigned to the execution of the operations. In the following description of the functions, these groups of features and groups of resources are referred to symbolically, with unique name assumption.

Probability of Requesting an Operation

A significant factor of the value of pre-processing an operation is given by the probability of its execution being requested. This request may originate from a user or automated system managing an execution plan, for example, in a scientific workflow domain. A function, p_request, is defined to return the probability of operation $\alpha$ being requested to be executed at time instant t, consuming a dataset containing features $f_i$.

In one or more embodiments, historical provenance data are continuously collected by means of monitoring the operations to collect data about the context and metrics of their execution. Based on such data, machine learning techniques are then applied to create and update predictive models used by p_request.

In order to assess whether a particular operation may be requested to be executed at a given time instant, the function needs to consider characteristics of the domain such as user profiles, or seasonality of execution of data flows. The definition of p_request may therefore be domain-specific.

In the following description, the algorithm is assumed to be implemented by a function with the following signature:

p_request ($f_i$, $\Delta_i$, $\alpha$, t, $\mathbb{F}$).

The function p_request also receives arguments $\Delta_i$ and $\mathbb{F}$. Argument $\Delta_i$ is a time interval, which measures how long the group of features $f_i$ has been available. Argument $\Delta_i$ is used to model the influence of such a time interval in the likelihood of executing the operation. Typically, it might take some time for the users to be aware that an operation can be executed. On the other hand, operations on datasets that become old can be less likely to be executed.

Argument $\mathbb{F}$ is a set of all features of the available datasets at time instant t. Argument $\mathbb{F}$ is used because operations that generate features that are already available are less likely to be requested. In other domains, other implementations can be considered.

Probability of Finishing Execution of Operation

In one or more embodiments, the value of pre-processing an operation depends on whether there is enough time to execute it, given the available resources, before it is requested. Thus, a function p_finish, is defined that returns the probability of finishing the pre-processing of operation $\alpha$ within t time instants, consuming a dataset containing features $f_i$ and using allocated resources R.

Like the probability of requesting an operation, this p_finish function can also be learned by applying machine learning algorithms over provenance data.

The probability of finishing the execution is also dependent on the domain. An implementation of the function with the following signature is assumed:

p_finish ($f_i$, $\alpha$, $\Delta_\alpha$, R, t), which also receives as parameter $\Delta_\alpha$, a time interval that measures how long operation $\alpha$ has been executed. This parameter is important so that the method can also evaluate the value of an operation that is currently being pre-processed. By comparing that value to the value of pre-processing other operations, a management system can decide to halt its execution in favor of another, more valuable, operation.

Probability of Operation Generating Datasets With Specific Group of Features

The value of pre-processing an operation depends on the likelihood of it generating output containing features that are valuable. Thus, a function p_features is defined in one or more embodiments with the following signature:

p_features ($f_i$, $\alpha$, $f_o$), which returns the probability of operation $\alpha$ generating output containing the group of features $f_o$ when consuming input containing the group of features $f_i$.

The learning of such a function relies on the systematic extraction of features from datasets as they are made available, as described in U.S. patent application Ser. No. 15/191,755, filed Jun. 24, 2016, entitled "Methods and Apparatus for Data Pre-Processing in Dataflow Operations," incorporated by reference herein, and the application of machine learning techniques to create the prediction models that map the relation between features of input and output datasets of each operation.

Probability of Enabling Execution of Operation With Partial Inputs

One or more embodiments of the invention calculate the indirect value of an operation when it generates features that are necessary for the execution of other valuable operations. In order to calculate this indirect value of pre-processing an operation, cases in which only part of the features required by further operations are produced have to be considered.

For this, a function p_enable, is defined in one or more embodiments, and implemented by a function with the following signature:

p_enable ($\beta$, $\mathbb{F}$, $t_1$, $t_2$), which returns the probability of operation $\beta$ being enabled at time instant $t_2$ given that datasets corresponding to the set of features $\mathbb{F}$ were already available at $t_1$. For an operation to be enabled, all the necessary inputs need to be provided. Since the exemplary pre-processing valuation method does not deal with the concrete input datasets, this restriction is expressed through a relation between the operation and the groups of features that are present in the datasets consumed by the operation. This information can likely be retrieved from provenance data from past executions of the operation.

The function p_enable also considers the set $\mathbb{F}$ of all available groups of features. The features that are already available may configure part of the input required by $\beta$. Furthermore, the available features may influence the probability of all input datasets required by $\beta$ becoming available in the interval between $t_1$ and $t_2$.

Pre-Processing Valuation Method

One or more embodiments of the invention provide a pre-processing valuation method for evaluating the value of pre-processing operations. The exemplary method leverages the probabilistic functions described in the previous section.

The value of pre-processing an operation is related to the importance of the features generated by the operation in the current context. It is dependent on whether the operation will be requested and whether it will have already been pre-processed by the time the request is received.

FIG. 8 illustrates exemplary pseudo code of a pre-processing valuation method 800 according to one embodiment of the invention. In the exemplary pre-processing valuation method 800, the direct component of the value of pre-processing an operation is given by a sum of values considering these factors (lines 1-5).

One or more aspects of the present invention also recognize that the value of pre-processing an operation has an indirect component. This indirect value of pre-processing an operation is a fraction of the value of pre-processing the operations it enables. In the exemplary pre-processing valuation method 800, this value is given by a sum of values given by recursive calls (lines 7-10).

The exemplary pre-processing valuation method 800 shown in FIG. 8 considers both the direct and indirect contributions of pre-processing an operation. The pre-processing valuation method 800 returns the value of pre-processing operation $\alpha$, consuming a dataset that contains the group of features $f_i$ and using resources R. The exemplary pre-processing valuation method 800 considers a maximum time window $t_z$, so that the value of pre-processing the operation a considers only the situations when the execution of $\alpha$ finishes within at most $t_z$ time instants. As mentioned above, in the pre-processing valuation method 800, a discrete representation of time instants is considered, but an implementation considering continuous time should be apparent to a person of ordinary skill in the art from this definition by replacing summations by integrals.

The parameters of the exemplary pre-processing valuation method 800 are:

$f_i$: group of input features present in the dataset that became available;

$\Delta_i$: the time interval since group of features $f_i$ has been available;

$\alpha$: an operation;

$\Delta_{alpha}$: the time interval since a has started being pre-processed, or zero if not yet executing;

R: the allocated resources for the execution of $\alpha$;

$\mathbb{F}$: the set of all available groups of features in the current context;

$\mathbb{O}$: the set of all possible operations;

$\mathbb{D}$: the set of all possible groups of features; and $t_z$: a time instant, representing the last instant in the time windows under consideration.

As noted above, the direct component is given by three nested summations that consider various factors (lines 1-5).

The probability of operation $\alpha$ being requested at each time instant $t_1$ (line 1) is combined with the probability of it finishing pre-processing at each time instant $t_2$ (line 2). It is assumed that pre-processing starts immediately after the evaluation. In this way, $t_1$ corresponds to the time after the evaluation starts and $t_2$ corresponds to the duration of the pre-processing. These probabilities scale the contextual value of the each set of features $f_o$ in $\mathbb{D}$ that can be possibly generated by a (lines 3-5).

The contextual value of a group of features in a context where other groups of features are already available is given by an auxiliary function feat_value, discussed below.

The relationship between $t_1$ and $t_2$ establishes whether each $f_o$ in $\mathbb{D}$ possibly generated by a contributes all of its contextual value or just a fraction of it. This is decided through an auxiliary function time_factor (line 4), described below.

The exemplary pre-processing valuation method 800 also considers a globally available constant $0 \leq \gamma \leq 1$, in line 6, which represents the growing uncertainty about the indirect component given by recursive calls. The indirect component (lines 7-10) considers the value of pre-processing all possible operations enabled by all the possible groups of features generated by $\alpha$.

A recursive call to preproc_value is made for each one of these operations $\beta$, considering an updated context where the remaining time window and the set of available features are updated to reflect the context after a has been pre-processed. Furthermore, an auxiliary function res_avg is used to estimate the resources to be allocated for the pre-processing of $\beta$ in each of these calls. Function res_avg is described below.

Each of these recursive calls consider an indirect component as well. This represents the fact that pre-processing $\alpha$ may enable the pre-processing of an operation $\beta$, which enables further operations which are themselves valuable. Since the indirect component of $\beta$ is also multiplied by a fraction $\gamma$, this means that the indirect component in the n-th recursive call contributes $\gamma^n$ to the indirect component of pre-processing $\alpha$. Notice that the uncertainty about the indirect component tends to be higher due to the fact that resources might not be available for the execution of all possible subsequent operations.

Contextual Value of a Group of Features

In the above description of the pre-processing valuation method 800, a user-provided function feat_value is assumed, defined based on domain knowledge and capable of computing the contextual value of a group of features present in a dataset in a consistent scale, which allows the comparison between features consistently throughout the domain.

The contextual value of a new dataset with a specific group of features depends on the datasets already available, each one with its specific group of features. This value considers both the computational aspects and the domain process characteristics.

First of all, datasets with features that can be obtained only by means of expensive and long computations should have higher values than datasets with features that are obtained by means of simple and inexpensive data transformation operations.

Secondly, features that deeply affect decision making and/or indicate urgency should also yield higher values. For example, in the monitoring of an oil platform, features that indicate critical safety situations should yield the highest values, since the detection of those features is critical and leads to a completely different operation.

Furthermore, implementations of feat_value could take into account additional provenance information when considering that some features are less valuable when they are easily generated from features already available in the context. Thus, one or more embodiments referred to in the description of the pre-processing valuation method 800, has the following signature:

feat_value (f, $\mathbb{F}$), where f is a group of features of a new dataset and $\mathbb{F}$ is the set of all groups of features of the datasets already available in the context. The feat_value function returns the contextual value of f depending on how difficult it is to generate it within the current context.

Time Factor

The exemplary pre-processing valuation method 800 also considers the temporal aspect of pre-processing an operation. If the pre-processing of the operation finishes before the operation is requested, i.e., before the dataset with features it generates is necessary, the value of that pre-processing is higher than if it is delayed.

The measure by which the pre-processing of an operation $\alpha$ loses value due to delay also depends on the domain. An implementation is assumed where this loss depends on the group of features of the dataset generated by $\alpha$. Datasets that usually take a while to be used by other operations and have long term effects might not lose any value—in which case time_factor returns 1 regardless of delay. On the other hand, datasets with critical features (indicating fleeting optimization opportunities, for example) might be useless unless generated in time—in which case time_factor should return 0 when there is a delay.

A standard evaluation can be defined for groups of features in general, and for groups of features for which there is no domain knowledge defining the loss of value due to delay. A sample implementation of time_factor is presented below in which the value of delayed pre-processing decreases linearly as the delay increases, ignoring the group of features f of the input dataset. When the pre-processing ends before the operation is requested, no reduction of the value is observed; when just part of the pre-processing occurs before the request, a partial loss occurs.

$$\text{time\_factor}(f, t_1, t_2): \begin{cases} t_1 \geq t_2: & 1 \\ t_1 < t_2: & 1 - \dfrac{(t_2 - t_1)}{t_2} \end{cases}$$

As stated above, other implementations of time_factor could be used, especially ones considering the features in f.

Average Resources Consumed by an Operation

In order to assess the value of pre-processing an operation in data-intensive domains, it is necessary to consider the estimated resources to be allocated to that operation. In the initial call to the exemplary pre-processing valuation method 800, the parameter R configures the resources allocated for pre-processing operation α.

In each of the recursive calls, however, it is necessary to provide the resources that are going to be allocated for the pre-processing of β. Since the exemplary pre-processing valuation method 800 does not rely on complete knowledge over the execution context, the pre-processing valuation method 800 cannot infer which resources are going to be freed or taken by other operations by the time β is enabled. Thus, a method for estimating the resources to be allocated for each operation in the domain may be necessary.

Such a method as res_avg, is defined with the following signature:

res_avg (β, f), assuming it to return the average resources used by an operation β given that the input provided to β has group of features f. The implementation of res_avg typically resorts to either domain specialist knowledge and/or machine learning over provenance data from previous executions of the operations.

EXAMPLES

Massive Big Data Workflows

In some Big Data contexts, sequences of transformations of large amounts of data typically occur. Such transformations can take a long time and the decision about what to do next usually depends on user intervention. If we previously execute transformations before the user requests them, either using idle resources or even provisioning additional resources, in the case of cloud computing, insights about the data can be generated much earlier and the benefits of decision making based on such insights can be much greater. A typical use case is the seismic processing and interpretation within the Oil and Gas industry. Seismic processing applications could take weeks to be finished. Therefore, it is crucial to reduce the time to identify potential areas with hydrocarbon indicators. The method of this invention is particularly important in such domains, in which the anticipation of useful operations is likely to lead to earlier return over investment.

Real-Time Monitoring of Industrial Processes

Industrial plants have thousands of sensors and many key performance indicators, which are calculated during the operation. In order to make decisions, it is often necessary to resort to simulations starting from the current situation and to data reconciliation procedures that combine sensored data and predictions based on domain knowledge. Whenever we are able to rank and previously execute simulations that help decision making, even if they are not explicitly requested, we increase the chances of being able to address the potential problems in due time, avoiding substantial losses.

In order to decide what is worthwhile to pre-process, it is necessary to estimate the value of pre-processing enabled operations on available datasets. Such an estimation takes into account the various sources of uncertainty. A set of predictive functions are employed to deal with these sources of uncertainty probabilistically. The disclosed pre-processing valuation method 800 combines these functions to estimate the value of pre-processing new operations and finishing current pre-processing operations.

CONCLUSION

One or more embodiments of the invention launch operations automatically before their execution is requested from within the workflow to which they belong, in order to reduce or substantially minimize the total time that end users need to wait for their processed data to be ready for use.

In the field of scientific data processing, for example, digital data collected through various sources, such as sensors, mobile devices or even data coming from other software systems, often needs to be transformed or processed through various operations in several stages until it can be utilized by systems such as analytic or predictive software. One or more embodiments of the invention provide a mechanism that allows for complex dataflows to be carried out substantially autonomously and efficiently, time-wise and resource-wise, combining ideas of Dynamic Composition of Dataflows and Ahead-of-Time Data Processing. Dynamic Composition of Dataflows is a mechanism by which flows of data from users are learned. Ahead-of-Time Data Processing is a mechanism by which data to process is selected based on available computational resources and a likelihood of data to be used or needed by end users.

The foregoing applications and associated embodiments should be considered as illustrative only, and numerous other embodiments can be configured using the dataflow operation pre-processing techniques disclosed herein, in a wide variety of different applications.

It should also be understood that the techniques for valuing pre-processed operations in dataflow operations, as described herein, can be implemented at least in part in the form of one or more software programs stored in memory and executed by a processor of a processing device such as a computer. As mentioned previously, a memory or other storage device having such program code embodied therein is an example of what is more generally referred to herein as a "computer program product."

The disclosed techniques for valuing pre-processed operations may be implemented using one or more processing platforms. One or more of the processing modules or other components may therefore each run on a computer, storage device or other processing platform element. A given such element may be viewed as an example of what is more generally referred to herein as a "processing device."

Figure 9:
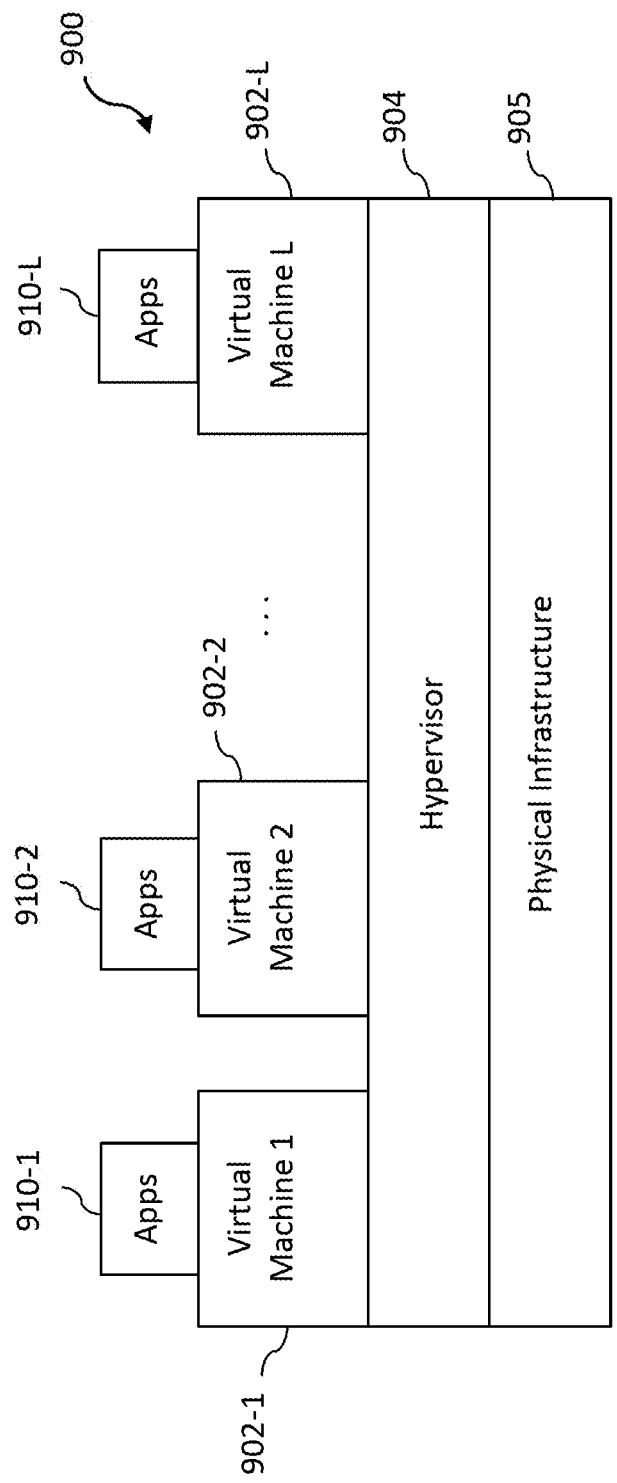
FIG. 9 illustrates an exemplary processing platform that may be used to implement at least a portion of one or more embodiments of the invention comprising a cloud infrastructure.

Referring now to FIG. 9, one possible processing platform that may be used to implement at least a portion of one or more embodiments of the invention comprises cloud infrastructure 900. The cloud infrastructure 900 in this exemplary processing platform comprises virtual machines (VMs) 902-1, 902-2, . . . 902-L implemented using a hypervisor 904. The hypervisor 904 runs on physical infrastructure 905. The cloud infrastructure 900 further comprises sets of applications 910-1, 910-2, . . . 910-L running on respective ones of the virtual machines 902-1, 902-2, . . . 902-L under the control of the hypervisor 904.

The cloud infrastructure 900 may encompass the entire given system or only portions of that given system, such as one or more of client, servers, controllers, or computing devices in the system.

Although only a single hypervisor 904 is shown in the embodiment of FIG. 9, the system may of course include multiple hypervisors each providing a set of virtual machines using at least one underlying physical machine.

An example of a commercially available hypervisor platform that may be used to implement hypervisor 904 and possibly other portions of the system in one or more embodiments of the invention is the VMware® vSphere™ which may have an associated virtual infrastructure management system, such as the VMware® vCenter™. The underlying physical machines may comprise one or more distributed processing platforms that include storage products, such as VNX™ and Symmetrix VMAX™, both commercially available from EMC Corporation of Hopkinton, Mass. A variety of other storage products may be utilized to implement at least a portion of the system.

In some embodiments, the cloud infrastructure additionally or alternatively comprises a plurality of containers implemented using container host devices. For example, a given container of cloud infrastructure illustratively comprises a Docker container or other type of LXC. The containers may be associated with respective tenants of a multi-tenant environment of the system, although in other embodiments a given tenant can have multiple containers. The containers may be utilized to implement a variety of different types of functionality within the system. For example, containers can be used to implement respective compute nodes or cloud storage nodes of a cloud computing and storage system. The compute nodes or storage nodes may be associated with respective cloud tenants of a multi-tenant environment of system. Containers may be used in combination with other virtualization infrastructure such as virtual machines implemented using a hypervisor.

Figure 10:
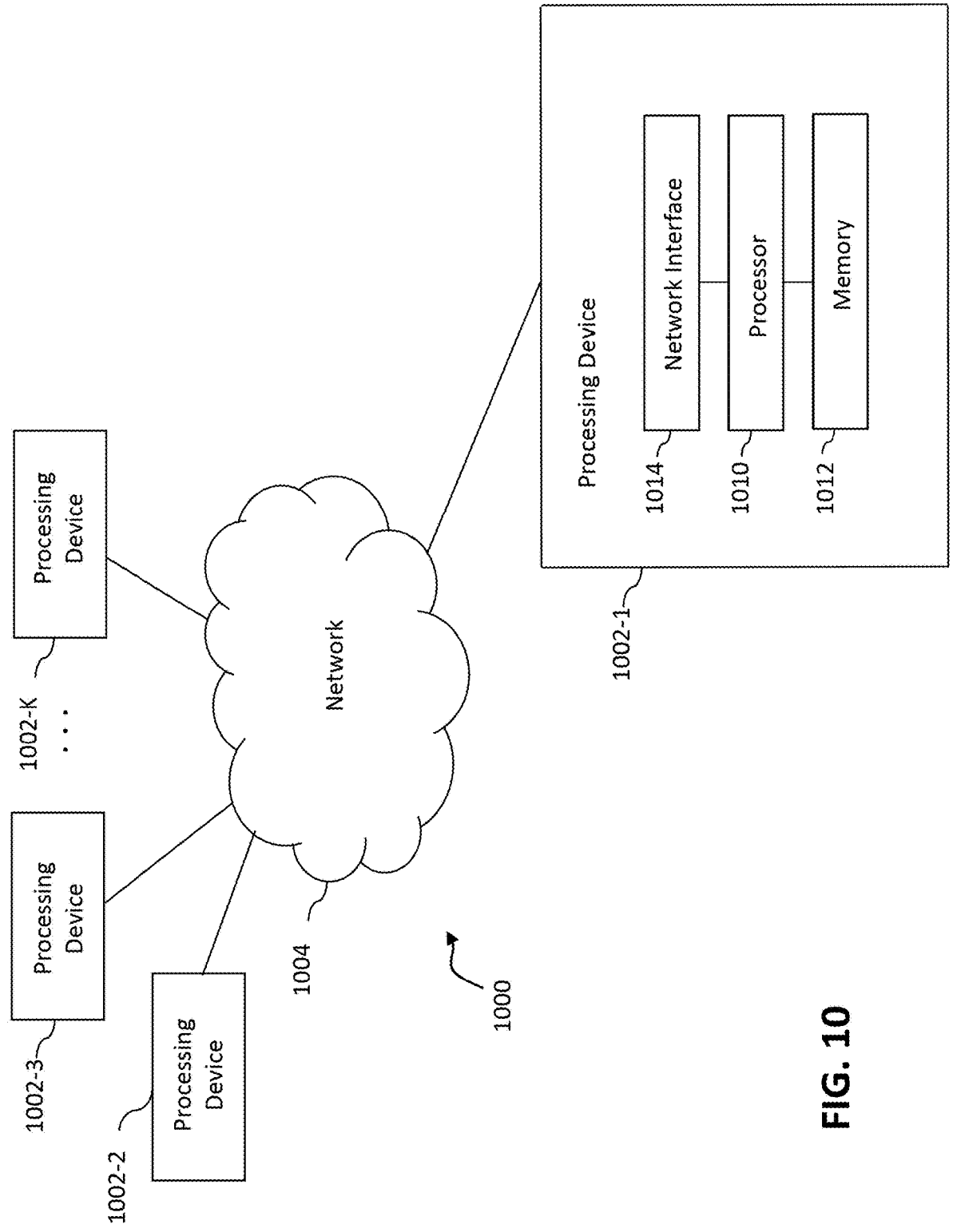
FIG. 10 illustrates another exemplary processing platform that may be used to implement at least a portion of one or more embodiments of the invention.

Another example of a processing platform is processing platform 1000 shown in FIG. 10. The processing platform 1000 in this embodiment comprises at least a portion of the given system and includes a plurality of processing devices, denoted 1002-1, 1002-2, 1002-3, . . . 1002-K, which communicate with one another over a network 1004. The network 1004 may comprise any type of network, such as a wireless area network (WAN), a local area network (LAN), a satellite network, a telephone or cable network, a cellular network, a wireless network such as WiFi or WiMAX, or various portions or combinations of these and other types of networks.

The processing device 1002-1 in the processing platform 1000 comprises a processor 1010 coupled to a memory 1012. The processor 1010 may comprise a microprocessor, a microcontroller, an application specific integrated circuit (ASIC), a field programmable gate array (FPGA) or other type of processing circuitry, as well as portions or combinations of such circuitry elements, and the memory 1012, which may be viewed as an example of a "computer program product" having executable computer program code embodied therein, may comprise random access memory (RAM), read only memory (ROM) or other types of memory, in any combination. Also included in the processing device 1002-1 is network interface circuitry 1014, which is used to interface the processing device with the network 1004 and other system components, and may comprise conventional transceivers.

The other processing devices 1002 of the processing platform 1000 are assumed to be configured in a manner similar to that shown for processing device 1002-1 in the figure.

Again, the particular processing platform 1000 shown in the figure is presented by way of example only, and the given system may include additional or alternative processing platforms, as well as numerous distinct processing platforms in any combination, with each such platform comprising one or more computers, storage devices or other processing devices.

Multiple elements of system may be collectively implemented on a common processing platform of the type shown in FIG. 9 or 10, or each such element may be implemented on a separate processing platform.

As is known in the art, the methods and apparatus discussed herein may be distributed as an article of manufacture that itself comprises a computer readable medium having computer readable code means embodied thereon. The computer readable program code means is operable, in conjunction with a computer system, to carry out all or some of the steps to perform the methods or create the apparatuses discussed herein. The computer readable medium may be a tangible recordable medium (e.g., floppy disks, hard drives, compact disks, memory cards, semiconductor devices, chips, application specific integrated circuits (ASICs)) or may be a transmission medium (e.g., a network comprising fiber-optics, the world-wide web, cables, or a wireless channel using time-division multiple access, code-division multiple access, or other radio-frequency channel). Any medium known or developed that can store information suitable for use with a computer system may be used. The computer-readable code means is any mechanism for allowing a computer to read instructions and data, such as magnetic variations on a magnetic media or height variations on the surface of a compact disk.

Also, it should again be emphasized that the above-described embodiments of the invention are presented for purposes of illustration only. Many variations and other alternative embodiments may be used. For example, the disclosed pre-processing valuation techniques are applicable to a wide variety of other types of communication systems, storage systems and processing devices. Accordingly, the particular illustrative configurations of system and device elements detailed herein can be varied in other embodiments. These and numerous other alternative embodiments within the scope of the appended claims will be readily apparent to those skilled in the art.

What is claimed is:

1. A method, comprising the steps of:
   extracting feature values from a data set;
   identifying a set of operations that previously processed data sets comprising said extracted feature values;
   determining whether to execute at least one individual operation from said set of operations before the execution of said at least one individual operation is explicitly requested based on a probabilistic evaluation of a value of pre-processing said at least one individual operation, wherein said value comprises one or more of (i) an estimated value of one or more features produced by the at least one individual operation, and (ii) an estimated value of one or more additional operations enabled by one or more features of data produced by the at least one individual operation; and
   executing a set of instructions for said at least one individual operation, wherein said set of instructions includes a proactive execution of said at least one individual operation before the execution of said at least one individual operation is explicitly requested, when said determining step determines that said at least one individual operation is to be executed.

2. The method of claim 1, wherein said explicit request for the execution of said at least one individual operation is done by one or more of a user, a workflow management system, and a job scheduling system.

3. The method of claim 1, wherein said set of instructions further comprises one or more of stopping execution of one or more of other operations being executed, freeing one or more resources required by said at least one individual operation, and allocating one or more of said resources required by said at least one individual operation.

4. The method of claim 1, wherein said data set comprises a newly available data set.

5. The method of claim 1, wherein said at least one individual operation is an operation that is executing as determined in a previous evaluation of said determining step.

6. The method of claim 1, wherein said probabilistic evaluation of the value of pre-processing comprises a probabilistic assessment of the at least one individual operation being requested at one or more specific times within a predefined time frame.

7. The method of claim 6, wherein said probabilistic assessment of the execution of the at least one individual operation being requested at each specific time within a predefined time frame is based on one or more of a time interval during which said data set with the extracted feature values has been available and a set of features of available data sets.

8. The method of claim 1, wherein said probabilistic evaluation of the value of pre-processing comprises a probabilistic assessment of the at least one individual operation finishing pre-processing at one or more specific times within a predefined time frame.

9. The method of claim 8, wherein said probabilistic assessment of said at least one individual operation finishing pre-processing is based on one or more of an estimation of computational resources to be allocated for the execution of the pre-processing of said at least one individual operation and a time interval during which said at least one individual operation has been executing.

10. The method of claim 1, wherein said probabilistic evaluation of the value of pre-processing comprises one or more of a probabilistic assessment of possible features of the data sets produced by the at least one individual operation with an assignment of a pre-processing value to each possible feature, and a scaling factor that considers the relation between a time in which said at least one individual operation finishes pre-processing and a time in which said at least one individual operation is requested.

11. The method of claim 10, wherein said scaling factor depends on said each possible feature.

12. The method of claim 1, wherein said probabilistic evaluation of the value of pre-processing comprises an indirect component based on one or more of:
    a probabilistic assessment of the at least one individual operation finishing pre-processing at each specific time within a predefined time frame;
    a probabilistic assessment of possible features of the data sets produced by the at least one individual operation;
    a probabilistic assessment of a value of pre-processing one or more additional operations enabled by features of data sets produced by the at least one individual operation; and
    a moderating factor applied to one or more of said probabilistic assessments.

13. The method of claim 12 wherein said indirect component estimates resources to be allocated for the pre-processing of said one or more additional operations enabled by features of data sets produced by the at least one individual operation.

14. The method of claim 12, wherein said probabilistic assessment of a value of pre-processing one or more additional operations enabled by features of data sets produced by the at least one individual operation takes into account one or more of a time in which said at least one individual operation finished pre-processing; a time in which said additional operations are enabled; and a time frame for the execution of said additional operations.

15. A computer program product, comprising a non-transitory machine-readable storage medium having encoded therein executable code of one or more software programs, wherein the one or more software programs when executed by at least one processing device perform the following steps:
    extracting feature values from a data set;
    identifying a set of operations that previously processed data sets comprising said extracted feature values;
    determining whether to execute at least one individual operation from said set of operations before the execution of said at least one individual operation is explicitly requested based on a probabilistic evaluation of a value of pre-processing said at least one individual operation, wherein said value comprises one or more of (i) an estimated value of one or more features produced by the at least one individual operation, and (ii) an estimated value of one or more additional operations enabled by one or more features of data produced by the at least one individual operation; and
    executing a set of instructions for said at least one individual operation, wherein said set of instructions includes a proactive execution of said at least one individual operation before the execution of said at least one individual operation is explicitly requested, when said determining step determines that said at least one individual operation is to be executed.

16. A system, comprising:
    a memory; and
    at least one processing device, coupled to the memory, operative to implement the following steps:
    extracting feature values from a data set;
    identifying a set of operations that previously processed data sets comprising said extracted feature values;
    determining whether to execute at least one individual operation from said set of operations before the execution of said at least one individual operation is explicitly requested based on a probabilistic evaluation of a value of pre-processing said at least one individual operation, wherein said value comprises one or more of (i) an estimated value of one or more features produced by the at least one individual operation, and (ii) an estimated value of one or more additional operations enabled by one or more features of data produced by the at least one individual operation; and
    executing a set of instructions for said at least one individual operation, wherein said set of instructions includes a proactive execution of said at least one individual operation before the execution of said at least one individual operation is explicitly requested, when said determining step determines that said at least one individual operation is to be executed.

17. The system of claim 16, wherein said explicit request for the execution of said at least one individual operation is done by one or more of a user, a workflow management system, and a job scheduling system.

18. The system of claim 16, wherein said set of instructions further comprises one or more of stopping execution of one or more of other individual operations being executed, freeing one or more resources required by said at least one individual operation, and allocating one or more of said resources required by said at least one individual operation.

19. The system of claim 16, wherein said probabilistic evaluation of a value of pre-processing comprises a probabilistic assessment of one or more of: the at least one individual operation being requested at one or more specific times within a predefined time frame; the at least one individual operation finishing pre-processing at one or more specific times within a predefined time frame; and possible features of the data sets produced by the at least one individual operation with an assignment of a pre-processing value to each possible feature; and a scaling factor that considers the relation between a time in which said at least one individual operation finishes pre-processing and a time in which said at least one individual operation is requested.

20. The system of claim 16, wherein said probabilistic evaluation of a value of pre-processing comprises an indirect component based on one or more of:
   a probabilistic assessment of the at least one individual operation finishing pre-processing at each specific time within a predefined time frame;
   a probabilistic assessment of possible features of the data sets produced by the at least one individual operation;
   a probabilistic assessment of a value of pre-processing one or more additional operations enabled by features of data sets produced by the at least one individual operation; and
   a moderating factor applied to one or more of said probabilistic assessments.

* * * * *